METHOD FOR DYEING ACRYLONITRILE POLYMER FIBERS
Original Filed Dec. 20, 1962
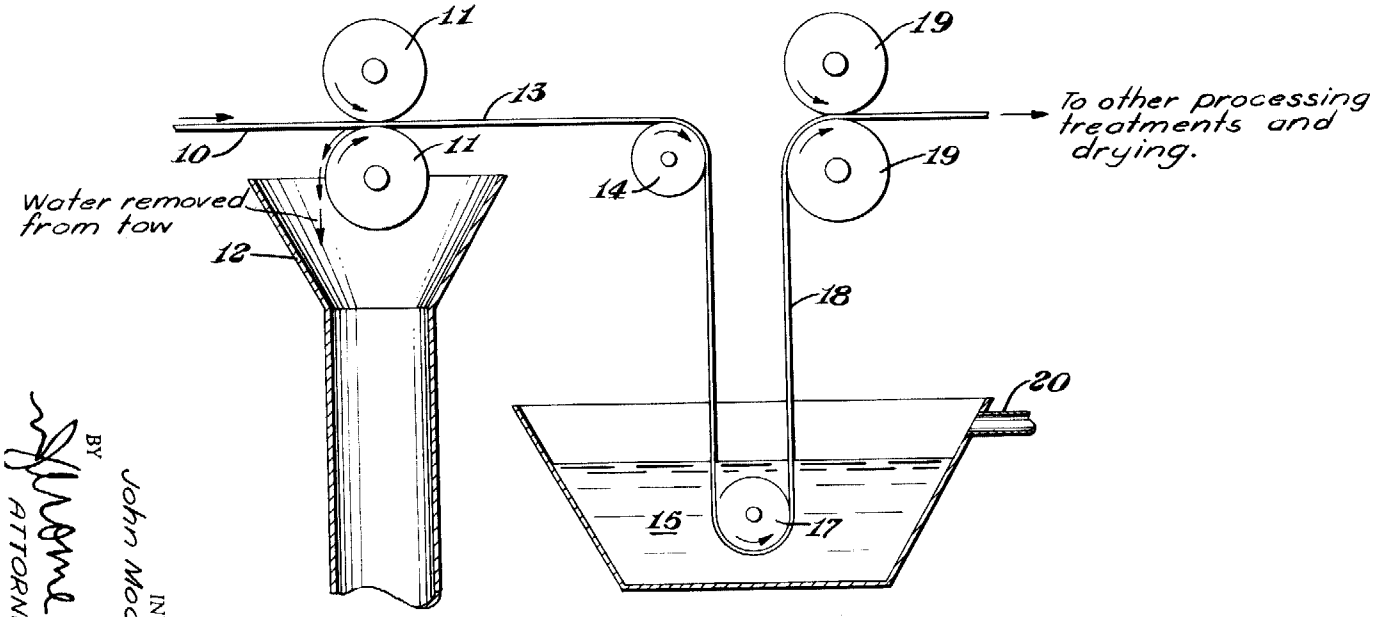
INVENTOR
John Moore
BY
Jerome Rudy
ATTORNEY United States Patent Office Re. 25,831
Reissued Aug. 3, 1965

25,831
METHOD FOR DYEING ACRYLONITRILE POLYMER FIBERS

John Moore, Williamsburg, Va., assignor to The Dow Chemical Company, Midland, Mich., a corporation of Delaware Original No. 3,113,827, dated Dec. 10, 1963, Ser. No. 246,150, Dec. 20, 1962. Application for reissue Oct. 29, 1964, Ser. No. 422,478
5 Claims. (Cl. 264—78)

Matter enclosed in heavy brackets [ ] appears in the original patent but forms no part of this reissue specification; matter printed in italics indicates the additions made by reissue.

This invention contributes to the synthetic fiber art and has particular reference to the dyeing of synthetic fibers. Particularly, it relates to a method of dyeing wet-spun acrylonitrile polymer fibers while they are in a freshly formed gel condition.

Synthetic fibers, including acrylonitrile polymer fibers, have always been difficultly dyeable in contrast to the commonly available natural fibers, i.e., cotton and wool. Several methods of approach have been pursued in attempting to solve the inherent and attendant difficulties encountered with the acrylonitrile polymer or acrylic fiber dyeability. Among these have been the development of dyestuffs or particular dyeing procedures specifically designed for or especially suited to the polymer structure. Other schemes included building into the polymer structure sites which are receptive to dyestuffs such as might be accomplished by certain additaments that are copolymerized with acrylonitrile to fiber forming polymers, or incorporated in the acrylonitrile polymer by blending and the like.

Although the foregoing means have frequently led to better dyed or dyeable fibers, usually, more tedious and cumbersome techniques are required which are more costly than normally operated procedures for which dye houses are normally equipped. Or, particularly when dye assisting additaments are incorporated in the fiber forming polymer through copolymerization and so forth, theire is a sacrificial loss in some of the inherent properties so desirable in the polyacrylonitrile backbone. Even when improved dyeability is obtained, the inability to obtain through-dyed fibers has frequently persisted. Another method sometimes employed, is to add color, generally in the form of a pigment, into the spinning solution, frequently called spinning dope. This method, however, has the inherent disadvantage of contaminating the polymer handling and conveying systems with colored bodies which must be dealt with when plain white fibers are subsequently to be manufactured in the same equipment.

Dyeing acrylonitrile polymer fibers that have been spun from certain aqueous salt solutions has been proposed in U.S. Patent 2,558,735. This patent describes a method for dyeing the acrylonitrile polymer fibers while they are in the form of a gel structure, i.e., before the fiber has been irreversibly dried. Although this method has proved to be a particularly useful one for dyeing such fibers, nevertheless there are certain attendant difficulties which detract from its commercial potentialities. For instance, great difficulty is encountered in controlling the dyeing of the gel fiber as well as obtaining a uniformly dyed fiber that is dyed to level shades of coloration on a continuous basis.

Accordingly, it is the chief aim *and* [ond] primary object of the present invention to provide an improved and highly efficient method for dyeing acrylonitrile polymer fibers whereby fibers are uniformly dyed to a level shade of coloration and which are continuously obtained with such excellent dyed properties in an unusually short dyeing cycle. This and related objects will be manifest in the ensuing disclosure and specification taken together with the sole figure of the drawing.

In accordance with the present invention, a method is provided for dyeing acrylonitrile polymer gel or *aquagel* [aquege] filaments comprising spinning a solution of a polymer of an ethylenically unsaturated monomeric material containing at least about 80 weight percent polymerized acrylonitrile into an aqueous coagulating bath to form acrylonitrile polymer filaments; washing the filaments essentially free of any residual acrylonitrile polymer solvent, said washed filaments containing at least about 300 weight percent water based on the dry weight of the filament; reducing the water content of the gel fiber to between about 100 and 200 weight percent, based on the dry weight of the filament; immersing the gel filament in a dye bath; removing excess dye solution from the gel filaments; and, subsequently irreversibly drying the gel filaments to a textile fiber.

Referring to the figure of the drawing, therein is schematically portrayed a preferred method for carrying out the invention. An acrylonitrile polymer aquagel tow 10 containing from about 300 to 600 weight percent water, based on the dry weight of the tow, and travelling from left to right (as indicated by the directional arrow) after having been washed free of polymer solvent and at least partially oriented, is passed between a pair of nip rolls 11. While being passed between nip rolls 11, the water content of the tow is reduced to between about 100 and 200 weight percent water, based on the dry weight of the tow by the squeezing action of the rolls. The water thus removed from the tow is allowed to drain off through drain 12. The aquagel tow 10 is generally and preferably fed to nip rolls 11 directly from a stretching or orienting operation, but other intermediate treatments may also be performed on the tows such as the addition of various treating agents, for instance, various lubricating and antistatic agents may be applied to the tow prior to its entry into nip rolls 11 provided such agents do not interfere with the subsequent dyeing operation. The pressure applied to the tow between nip rolls 11 can be controlled for any sufficient pressure to reduce the water content to the desired amount and will depend primarily upon the amount of water in the tow prior to entering the rolls and the amount of residual water that is desired to be maintained in the gel fibers. In any event, the pressure should not be so great as to actually physically damage the fibers. Conveniently, the nip rolls are of a firm but yet resilient material such as hard rubber so that any crushing action of the rolls on the fibers is minimized.

The semi-dehydrated aquagel tow 13, now containing between about 100 and 200 percent water, based on the dry weight of the fiber, is passed around guide roll 14 and then down into dye solution 15 contained in dye bath 16. The tow is passed around guide roll 17 and the dyed aquagel tow 18 is then forwarded upwards and through nip rolls 19 which squeeze any excess dye solution from the fibers. The excess dye solution is allowed to run down the fibers back into the dye bath 16. The dyed aquagel tow 18 after passing through nip rolls 19 is then forwarded on to further processing which may include a steaming operation to set the dyestuff, or to another dye solution for further dyeing in the manner described above or for application of other chemical agents and treatments, or, it may be passed directly to a drying oven to irreversibly dry the gel fiber. Drying of the fiber is generally the ultimate treatment and will follow any of the intermediate liquid treating operations.

To compensate for the dye solution picked up or absorbed by tow 113, a stock dye solution containing a predetermined dye concentration is continually (or intermittently) pumped into the dye bath 16 through a delivery tube or inlet 20 (from a source not shown) at a predetermined rate which depends primarily upon the rate at which the tow is passed through the dye as well as the ability and the rapidity of the aquagel tow to take up the dyestuff.

The actual amount of dye solution that is picked up by the aquagel in the dye bath 16 is additionally controlled to a large extent by the pressure applied to the tow while passing through nip rolls 19. As before, the pressure of these nip rolls 19 should not be so great as to physically damage the gel fibers. Conveniently, these rolls have a covering of hard rubber or similar resistant material such as those of nip rolls 11.

The fibers dyed in accordance with the present invention possess excellent physical properties in addition to being through dyed to excellent deep shades of coloration both throughout the crosss section as well as along the length of the fibers. They exhibit outstanding and superior resistance to fading from exposure to washing and light. The present inventive method provides a highly expedient and efficient means for continuously, rapidly, uniformly and reproduceably dyeing acrylonitrile fibers employing a wide variety of dye stuffs.

The residence time of the gel fiber in the dye bath is extremely short, i.e., usually on the order or $1/20$ to $1/10$ second. Despite this unusually short dyeing cycle, the fiber is uniformly dyed throughout the cross section of the fiber as well as lineally. Not only is each filament dyed to a level shade of coloration throughout, but the complete tow which may be 100,000 or so denier is uniformly dyed throughout.

The invention is applicable to the dyeing of acrylonitrile polymer fibers which are fabricated from fiber forming acrylonitrile polymers that contain in the polymer molecule at least about 80 weight percent of polymerized acrylonitrile, and is especially applicable to the dyeing of homopolymeric acrylonitrile, which are wet spun in and with systems that are adapted to utilize aqueous coagulating liquids in the spinning operation, such as systems wherein ethylene glycol dimethylformamide, dimethylsulfoxide, butyrolactome and the like or the various saline polyacrylonitrile-dissolving solvents are employed as spinning solution solvents for the polymer and are also present in non-polymer dissolving quantities in the aqueous coagulating liquid used in the spin bath.

The utile, known aqueous saline solvents for the various fiber forming acrylonitrile polymers and polyacrylonitrile include zinc chloride, the various thiocyanates such as calcium thiocyanate, lithium bromide, salt mixtures of the so-called "lyotropic" series, and others recognized by the art as has been disclosed, among other places, in United States Letters Patents Nos. 2,140,921; 2,425,192; 2,648,592; 2,648,593; 2,648,646; 2,648,648; 2,648,649; and 2,949,432. Advantageously, aqueous zinc chloride solutions are used for the purpose.

Exemplary of some of the monomeric materials that may be employed with the acrylonitrile in the preparation of the acrylonitrile polymer and copolymer fiber forming systems and dyed in accordance with the practice of the present invention include allyl alcohol, vinyl acetate, acryloamide, methacrylamide, methyl acrylate, 2-vinyl pyridine, ethylene sulfonic acid and its alkali metal salts, vinyl benzene sulfonic acid and its salts, 2-sulfoethylmethacrylate and its salts, vinyl lactams such as vinyl caprolactam and vinyl pyrrolidone, etc. and mixtures thereof.

As indicated, after acrylonitrile polymer fibers have been wet spun they are most frequently water washed or washed with an aqueous inert solution to remove any residual polymer solvent from the freshly formed filaments, thus forming an intermediate fiber product often referred to as a gel or aquagel filament. Thoroughly washed acrylonitrile polymer aquagel fibers, incidentally, are usually found to contain up to about 6 parts by weight of water (including residual extrinsic or exterior water associated therewith) for each part by weight of dry polymer therein. More frequently, washed acrylonitrile aquagel polymer fibers are found to contain from about 3 to 4 parts by weight of water for each part by weight of polymer.

The present invention can be carried out conveniently in standard spinning trains. That is, no major alterations to a conventional fiber forming process need be undertaken except to introduce the necessary nip rolls and dye bath as illustrated in the figure attached hereto. Because of the extreme speed at which the fibers can be dyed in practicing the present invention, the ordinary and commercially useful in spinning speeds can be employed while simultaneously obtaining an excellently dyed fiber. The invention provides a method for dyeing the gel fibers directly with essentially all classes of dyestuffs, without the use of dyeing assistants, at temperatures of ambient or higher temperatures, if desired, and in very short periods of time. Thus, because of the rapid absorption of dyestuffs in the tow containing the water content as prescribed by the present invention, exhausting or fixing agents commonly employed in dyeing procedures are not necessary with the present dyeing process. Acid or acid forming salts are not required for exhausting acid or metallized dyestuffs. With reactive dyes, no alkali is required in the dye bath. Electrolytes, such as sodium chloride or sodium sulfate, are not required for direct or neutral types of dyes. These salts in fact are beneficially avoided since they may precipitate the dye solutions, especially when solutions of relatively high concentrations of dyestuff are employed. (Of course, if desired suitable dye assistants such as those mentioned in the foregoing may be utilized in the dye bath when practicing the invention.) In addition to the rapid dye absorption into the gel fiber and the greatly enhanced dye uniformity of the fibers, the present invention provides for substantial reductions in dye or chemical liquor that is required to dye a unit weight of tow.

The concentration of water in the tow is to be rather closely controlled when dyeing the fibers in the method of the present invention. When the water content of the tow is much in excess of about 200 percent, based on the dry weight of the tow, the absorption by the fiber of the dyestuff is less effective, not only from the standpoint of being non-uniform and lacking through penetration, but additionally the actual amount or dye build-up, which is required for depth of shade, is significantly lower. On the other hand, when the water content of the gel fiber is much below about 100 percent, based on the dry weight of the fiber, the same general disadvantages are observed except that they are possibly caused from a different happenstance. In other words, when the water content comes much below about 100 percent, and certainly less than about 20 to 30 percent, the gel tends to collapse and does not provide for entry of the dyestuff at all or only to a slight degree. Below about 100 percent water in the gel, the build-up of dyestuff tends to decrease significantly such that for the same dye cycle as that used for a fiber containing about 200 weight percent water, a lesser depth of shade and frequently unlevelness is observed in the gel fiber containing the lower water content.

Other means may be employed for reducing the water content of the gel fibers before they are dyed in the practice of the invention. Instead of the nip rolls other constrictive means such as forcing the tow through a narrow opening or causing the tow to bend over a sharp angle under tension can be used to physically force the water from the filaments. Preferably, an actual mechanical force is thrust upon the fibers to remove the water advantageously, a pair of nip rolls is used to provide such force. Removel of the water by heating and evaporating is generally to be avoided for several reasons: the process of evaporation is much slower and interupts the continuity of the process making control more difficult; unless the evaporation or partial drying is carefully controlled the tow is not uniformly reduced in water content, some fibers may be too high in water content and some too low (the gel structure may actually collapse) so that dye uniformity is apt to be worse than if no water had been removed; some fiber-to-fiber fusion may occur unless certain chemical agents are added, and these agents may have to be removed before dyeing so that they do not interfere with dye uptake or resulting dye fastness properties; and such other reasons as the higher energy requirements of evaporation or drying and the difficulty of recovery of the water for reuse and the like.

Ordinarily the gel fibers are stretched to their ultimate desired orientation before they are passed into the dye bath and before the moisture content or water content is reduced. Thus, the fibers are generally stretched about 10 to 12 times their original extruded length, but lesser degrees of stretch may be imparted to the fibers and may be desirable for some purposes. It is also possible in the practice of the invention if the fibers are only partially oriented prior to having the water content reduced and before immersion into the dye bath. Then, subsequently, before the fiber is irreversibly dried the gel fiber may again be oriented by stretching to the desired or prerequisite degree.

The temperature of the dye bath will depend principally on the dyestuff employed. A dyestuff which is dissolved with difficulty will ordinarily require higher temperatures in order to remain uniformly dispersed throughout the solution. Temperatures ranging from ambient up to 100° are ordinarily employed in the practice of the invention but higher temperatures may also be utilized with the application of pressure to the dye bath. However, one of the attributes of the present invention is that uniform and rapid dyeing can be accomplished at relatively low temperatures and that pressure dyeing techniques are obviated by the present practice; therefore, the dye bath is ordinarily an open bath. If desired for one purpose or another, the gel fibers may be heated or cooled prior to immersion into the dye bath. If the fibers are passed to the nip rolls and dye bath directly from the stretching operation they are ordinarily at a higher than ambient temperature since the stretching is usually accomplished at 70–100° C. The fibers may be passed through a water bath at the desirable temperature if otherwise heating or cooling of the fibers is desired.

Depending upon the particular dyestuff employed and other conditions, for example, temperature, the concentration of the dye in the dye bath may be from as little as 0.001 weight percent, based on the weight of the solution, up to the saturation concentration of the dye stuff in the solution (which in actuality may either be a solution or a dispersion) or until normal operation would be effected by such things as agglomeration of the dyestuffs on the gel fibers and the like. Generally, excellent dye build-up and deep shades of coloration are obtained on the gel fibers by employing relatively dilute dye bath concentrations. As indicated, the concentration of the dye bath is maintained by continually adding dye solution which is usually of the same dye concentration as that employed in the dye bath proper. Since relatively little dilution of the dye bath occurs during the dye process, the actual amount of liquid in the dye bath is immaterial excepting to be sufficient that the gel fibers are at least completely immersed in the dye bath during their pass therethrough.

The dyestuffs that are beneficially employed in the practice of the present invention may be selected from any of a wide number of available dyestuff classes. Generally, all water soluble and water dispersible dyes including pigments, may be employed with advantage. Specifically, among those that may be mentioned are the vat, sulfur, direct, metallized, basic, acid, azoic, acetate, reactive, ingrain and the like classes of dyestuffs.

Better uniformity of dyeing is obtained when the gel fibers while passing through the dye bath, are under a relaxed tension. That is, they are neither being stretched nor are they in a relaxed condition such that any entanglement or crinkling of the gel fibers occurs while passing through the dye bath. Instead, they are held at a constant length and beneficially in a generally side by side relationship, i.e., the bundle or tow of fibers is in a ribbon-like condition. This assures better contacting of the dyestuff with each of the individual filaments that are in the tow bundle. For this purpose, nip rolls 11 and 19 are conveniently driven at the same speed.

The procedure of removing excess dye solution from the gel fibers when it emerges from the dye bath, is principally for that purpose, however, this function additionally aids in leveling the dye stuff on the fibers as well as removing occluded materials therefrom. As before mentioned, little dilution of the dye bath takes place during the dyeing process which means that the removal of the excess dye solution does not remove from the gel fiber much if any of the residual moisture or water that it contained when it entered the dye bath. In fact, the gel fiber, when it leaves the excess dye-removing step of the process, ordinarily contains more water (usually picked up from the dye solution itself) than it did immediately prior to the dye bath. In other words, the gel fiber has become more swollen and approaches its original water content that it contained after the washing step in its manufacture.

Following the dyeing of the gel filaments, they may be passed to a suitable steaming chamber to aid in setting or fixing the dye stuff in the acrylonitrile polymer fiber or, if desirable, the gel filaments may be passed through another dye bath similar to the first containing the same or a different dyestuff. Additionally, other wet or dry treating processes may be administered to the gel fibers such as the application of finishing and lubricating agents as well as certain heat treatments, crimping of the fibers, and so forth, either before or after irreversibly drying of gel filaments.

As has been indicated, when the acrylonitrile polymer, particularly polyacrylonitrile, fibers are being manufactured, zinc chloride may most advantageously be utilized as the sole, or at least the principal saline solute in the spinning solvent employed for the polymer. In such instances, the aqueous solution of zinc chloride in the spinning solution may advantageously be in a concentration range of from 55 to 65, preferably about 60 weight percent, based on the weight of the aqueous solution. The quantity of substantially pure water passed countercurrent to the filaments in the coagulation bath, should be sufficient, when such aqueous zinc chloride spinning solutions are employed, so as to maintain the concentration of zinc chloride in the portion of the liquid in the spinning zone at a nonpolymer-dissolving coagulation concentration of at least about 25 weight percent; advantageously from about 30 to 50 percent by weight and preferably between about 40 and 45 percent by weight. In such aqueous zinc chloride systems for acrylonitrile polymers, wherein the freshly wet spun polymer is generally obtained in an aquagel form, it is generally desirable for the spinning solution that is extruded to contain between about 4 and 20 percent by weight of dissolved polymer; more advantageously from about 6 to 15 weight percent of dissolved polymer; and preferably particularly when polyacrylonitrile fibers are being manufactured, from about 8.1 to 11.5 percent by weight of fiber-forming polymeric solids in the spinning solution.

Aqueous zinc chloride spinning solutions of fiber-forming acrylonitrile polymers are beneficially extruded at a spinning temperature from 0 to 50° C. preferably from about 10 to 30° C., into an aqueous zinc chloride coagulating liquid that is maintained at a coagulating temperature of 0 to 30° C.; preferably from about 10 to 20° C.

In order to further illustrate the invention, a tow of polyacrylonitrile aquagel fiber that contained from about 5 to 6 parts by weight of water in the gel phase to each part by weight of dry polymer in the aquagel structure, was obtained by extruding a spinning solution comprised of about 10 parts of polyacrylonitrile dissolved in about 90 parts of a 60 weight percent aqueous solution of zinc chloride into an aqueous coagulating bath that contained about 44 weight percent of zinc chloride dissolved therein. A multiple filament tow was prepared by extruding the spinning solution through a spinnerette having 500 round, 3 mil diameter orifices. The coagulated tow bundle after emerging from the coagulating bath was washed substantially free from salt by passing it through sequential water baths. It was then wet stretched at *about* [abou] 95° C. to orient the fibers to a total stretched length that was about 12 times the original extruded length. Following the stretching of the fibers, it was determined that the gel structure contained about 5 parts of water per part of dry polymer therein. Subsequently to the stretching, the aquagel tow bundle was dyed following the general procedure delineated in the attached drawing. The tow bundle was passed through a pair of nip rolls whereat the water content of the gel structure was reduced to about 2 parts per part of dry fiber in the gel structure (about 200 weight percent water based on the dry weight of the fiber) after which it was immersed in a dye bath while passing around a guide roll and thence up to a second set of nip rolls which removed excess dye solution from the gel filaments. The dyed tow bundle was then transferred to a drying oven wherein the fibers were irreversibly dried at about 140° C. for about 7 minutes to dyed textile fibers. The temperature of the dye bath was ambient and the residence time of the fibers in the dye bath was about 1/20 of a second. The foregoing procedure was repeated with each of the following dyestuffs in the aqueous dye bath.

| Dyestuff | Type | Color Index | Dyestuff Concentration In Dye Bath (Wt. Percent) |
|---|---|---|---|
| Gycolan Yellow GRL | Acid Metallized. | 13900 | 2.0 |
| Gycolan Blue GGL | do | 14880 | 2.0 |
| Xylene Light Red 2GL | Acid | 17045 | 2.0 |
| Chlorantine Fast Turquoise | Direct | 74180 | 2.0 |
| Cibalan Brilliant Yellow 3G | Reactive | None | 2.0 |
| Sevron Brilliant Red 4G | Basic | Basic Red 14. | 2.0 |

Upon investigating the dyed, dried filaments, it was observed in each case that they were excellently and uniformly dyed to deep shades of coloration throughout the length of the fiber as well as through the cross-section of the fiber, which was observed by microscopic examination of cross-sections of randomly selected fibers from the tow bundle.

In contrast, when the above procedure was repeated excepting to introduce the stretched filament into the dye bath without reducing the water content of the gel filaments as described, and both with and without passing the filaments through the nip rolls following the dye baths to remove excess dye solution, it was observed that the fiber samples had streaks of heavy and light shades of coloration (and in some instances only light staining) throughout the tow bundle in a linear direction, and upon observation of cross-sections of randomly selected filaments it was observed that many had not been dyed throughout the individual fiber cross-section.

It is to be understood that certain modifications and alterations of the herein specifically delineated embodiments of the invention can be entered into without departing from the intended spirit and scope of the invention. Therefore, the invention is to be interpreted in terms of the hereto appended claims.

What is claimed is:

1. In the method of producing dyed acrylonitrile polymer fibers of an ethylenically unsaturated monomeric material containing at least about 80 weight percent polymerized acrylonitrile, wherein [a solution of] said polymer is dissolved in a solvent for said polymer and is extruded into an aqueous coagulating bath to form gel filaments of said polymer, said filaments being subsequently washed essentially free of said solvent with an aqueous solution and at least partially oriented, said washed and oriented gel filaments containing at least about 300 weight percent of said aqueous solution in the gel structure, based on the dry weight of the gel filament, the improvement comprising (a) mechanically reducing the aqueous solution content of said washed and oriented filament to between about 100 and 200 weight percent, based on the dry weight of the filament;

(b) immersing said filament having a reduced solution content in an aqueous dye bath;

(c) removing excess dye solution from the dyed filament;

(d) and, subsequently, irreversibly drying said filament to a dyed textile filament.

2. In the method of producing dyed acrylonitrile polymer fibers of an ethylenically unsaturated monomeric material containing at least about 80 weight percent polymerized acrylonitrile, wherein [a solution of] said polymer is dissolved in a solvent for said polymer and is extruded into an aqueous coagulating bath to form gel filaments of said polymer, said filaments being subsequently washed essentially free of said solvent with an aqueous solution and at least partially oriented, said washed and oriented filaments containing at least about 300 weight percent of said aqueous solution in the gel structure, based on the dry weight of the gel filament, the improvement comprising (a) reducing the aqueous solution content of said washed and oriented filament to between about 100 and 200 weight percent, based on the dry weight of the filament, by passing the filament between a pair of cooperating rolls providing sufficient pressure to said filament to reduce the water content to said concentration range;

(b) immersing said filament in an aqueous dyebath;

(c) removing the excess dye solution from the dyed filament by passing said filament between a pair of cooperating rolls with sufficient pressure to remove excess dye solution;

(d) and, subsequently irreversibly drying said filament to a dyed textile filament.

3. The method of claim 2 wherein said acrylonitrile polymer is polyacrylonitrile.

[4. The method of claim 2, wherein said solution of an acrylonitrile polymer is an aqueous zinc chloride solution of said acrylonitrile polymer.]

5. The method of claim 2, and in addition thereto the step of steaming said dyed filament subsequently to removing said excess dye solution from said dyed filament and prior to irreversibly drying said dyed filament.

*6. The method of claim 2, wherein said solvent for the polymer is an aqueous zinc chloride solution.*

No references cited.

ALEXANDER H. BRODMERKEL, *Primary Examiner.*

ALFRED L. LEAVITT, *Examiner.*